(12) United States Patent
Burbulla et al.

(10) Patent No.: US 10,526,018 B2
(45) Date of Patent: Jan. 7, 2020

(54) FRONT END MODULE

(71) Applicant: Dr. Ing. h.c. F. Porsche Aktiengesellschaft, Stuttgart (DE)

(72) Inventors: Frank Burbulla, Leonberg (DE); Xuan Li, Ditzingen (DE); Herbert Klamser, Korntal-Muenchingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 109 days.

(21) Appl. No.: 15/822,331

(22) Filed: Nov. 27, 2017

(65) Prior Publication Data
US 2018/0148101 A1 May 31, 2018

(30) Foreign Application Priority Data
Nov. 30, 2016 (DE) .......................... 10 2016 123 156

(51) Int. Cl.
B60G 3/20 (2006.01)
B62D 21/15 (2006.01)

(52) U.S. Cl.
CPC .................................. B62D 21/155 (2013.01)

(58) Field of Classification Search
CPC .................................................... B62D 21/155
USPC ........................................... 280/784, 124.135
See application file for complete search history.

(56) References Cited

U.S. PATENT DOCUMENTS

| 9,399,487 | B2 * | 7/2016 | Fujita | B62D 21/11 |
| 2011/0025012 | A1 * | 2/2011 | Nakamura | B60G 3/20 |
| | | | | 280/124.135 |
| 2013/0257028 | A1 | 10/2013 | Kuwabara et al. | |
| 2014/0300137 | A1 * | 10/2014 | Komiya | B62D 21/11 |
| | | | | 296/187.11 |
| 2015/0108732 | A1 * | 4/2015 | Luttinen | B60G 3/265 |
| | | | | 280/93.512 |
| 2016/0052359 | A1 * | 2/2016 | Matayoshi | B60K 7/0007 |
| | | | | 180/65.51 |
| 2016/0236718 | A1 * | 8/2016 | Tatsuwaki | B62D 21/155 |
| 2017/0144707 | A1 * | 5/2017 | Craig | B62D 21/155 |
| 2017/0297519 | A1 * | 10/2017 | Canobbio | B60R 19/00 |
| 2018/0194183 | A1 * | 7/2018 | Mohrlock | B60G 3/20 |

FOREIGN PATENT DOCUMENTS

| DE | 10 2010 031 089 | 1/2012 |
| DE | 10 2013 203 504 | 10/2013 |

OTHER PUBLICATIONS

German Search Report dated Aug. 3, 2017.

* cited by examiner

*Primary Examiner* — Toan C To
(74) *Attorney, Agent, or Firm* — Gerald E. Hespos; Michael J. Porco; Matthew T. Hespos

(57) ABSTRACT

A front end module (10) has a cross member (12) that connects to longitudinal members (14) of a motor vehicle frame for carrying away loads from a bumper. An actuating rod (18) can pivot relative to the front wheel (22) due to relative movement of a part of the cross member (12) in the direction of travel of the motor vehicle during a small overlap crash. The actuating rod (18) in the pivoted-out state for rotating the front wheel (24) radially within a wheel rim ring (28) of the rim (22) can be gripped at the rim (22). Damage to the front wheel (24) by plastic deformation of the front end module (10) and by the actuating rod (18) can be avoided to permit satisfactory crash behavior of a motor vehicle.

10 Claims, 1 Drawing Sheet

FRONT END MODULE

CROSS REFERENCE TO RELATED APPLICATION

This application claims priority under 35 USC 119 to German Patent Appl. No. 10 2016 123 156.8 filed on Nov. 30, 2016, the entire disclosure of which is incorporated herein by reference.

BACKGROUND

Field of the Invention

The invention relates to a front end module which can form a front closure of a front vehicle part of a motor vehicle.

Description of the Related Art

DE 10 2010 031 089 A1 discloses a motor vehicle with a bumper, in which a laterally outwardly pointing part of the bumper can fold over into a wheelhouse upon impact against an obstacle with a small overlap ("small overlap crash"). The folded-over part of the bumper can press through a front tire from the inside onto a rim flange of a rim carrying the front tire, in order to rotate the front wheel into a position in which the obstacle can slide past a laterally outwardly pointing side surface of the front tire.

There is a constant need to improve the crash behavior of a motor vehicle.

It is the object of the invention to provide measures permitting satisfactory crash behavior of a motor vehicle. In particular, the risk of damage to a front wheel in the event of an impact with an overlap of a front lateral structure of the motor vehicle is intended to be reduced.

SUMMARY

The invention relates to a front end module for the front closure of a front part of a motor vehicle. The front end module comprise a cross member that is connectable to longitudinal members of a motor vehicle frame for carrying away loads from a bumper. A front wheel is mounted in an articulated manner and has a rim for supporting a tire. An actuating rod is pivotable relative to the front wheel by means of a relative movement of at least part of the cross member. The relative movement of at least part of the cross member takes place in the direction of travel of the motor vehicle. The actuating rod in the pivoted-out state for rotating the front wheel radially within a wheel rim ring of the rim can be gripped at the rim.

In the event of an impact of the motor vehicle against an obstacle with a small overlap ("small overlap crash"), only part of the bumper of the motor vehicle is loaded. Thus, it is possible for only part of the bumper and components following the bumper counter to the direction of travel to be deformed plastically. In particular, it is possible for the front end module of the motor vehicle to be deformed plastically into a wheelhouse that accommodates the front wheel. However, the cross member also is deformed plastically in this case, for example, by a laterally protruding end piece of the cross member being bent into the motor vehicle by means of the impact of the motor vehicle against the obstacle in the small overlap crash. The relative movement of the cross member can be sensed directly or indirectly by the actuating rod being able to be pivoted because of the portion of the relative movement of the bent end piece of the cross member in the direction of travel. The actuating rod is coupled to the cross member with travel reinforcement. Thus, a conscious empty play may be provided so that, in the event of a less hard crash, in which there need be no concern that the motor vehicle will be deformed into the volume that is bounded by the wheelhouse. In this situation, the actuating rod is not unnecessarily moved. The actuating end of the actuating rod points away from the cross member and can pivot from the interior of the motor vehicle into the volume bounded by the wheelhouse and can strike against the rim of the front wheel. These forces that occur during the crash can press the actuating rod against the rim to such an extent that the front wheel is rotated. As a result, the front wheel can be rotated out of a volume of the wheelhouse, into which plastic deformation of the motor vehicle could take place during a small overlap crash. Thus, the risk of damage to the front wheel is reduced. The actuating rod grips at the rim from radially within the wheel rim ring, rather than from radially on the outside. Thus, contact of the actuating rod with the tire of the front wheel can be avoided, and damage to the tire by the actuating rod is avoided. The pivoting of the actuating rod onto the rim within the wheel rim ring is triggered by a movement of the cross member during a small overlap crash and avoids damage to the front wheel by plastic deformation of the front end module and by the actuating rod itself. Thus, satisfactory crash behavior of a motor vehicle is achieved.

The actuating rod can be part of a link lever arrangement that has rods connected in an articulated manner to one another and act as link levers. Thus, the relative movement of that part of the cross member that is moved during the small overlap crash can be stepped up with respect to the pivot angle of the actuating rod. The stepping up ensures that the front wheel is rotated promptly before plastic deformation into the volume bounded by the wheelhouse of the front end module.

The actuating rod in the pivoted-out state can be gripped at a radially inwardly facing inner side of the wheel rim ring and/or at a laterally facing side surface of a wheel disk that connects the wheel rim ring to a hub. The inner side of the wheel rim ring and/or the side surface of the wheel disk form an abutment for an actuating end of the actuating rod that points away from the cross member. The forces introduced by the actuating rod can be carried away and converted into rotation of the front wheel.

The wheel rim ring and/or the wheel disk may have a receiving corner that extends in the circumferential direction for receiving an actuating end of the actuating rod. The receiving corner enables the actuating end to be supported both in the radial direction and in the axial direction of the rim, and therefore slipping of the actuating rod into the region of the tire can be avoided reliably. The receiving corner may be of encircling design in the circumferential direction. As a result, the actuating rod can rotate the front wheel even if the front wheel is still rotating while rolling along an underlying surface.

The actuating rod can be gripped at the rim for rotating a front part of the front wheel in behind an axis of rotation of the front wheel. As a result, when the actuating rod grips at the rim, the front part of the front wheel with respect to the direction of travel can be rotated into the motor vehicle and the rear part of the front wheel can be rotated away from the motor vehicle. The front wheel thereby is oriented oblique to the obstacle, and, therefore, the obstacle can slide past the side surface of the front wheel and the motor vehicle can be moved past the obstacle.

The actuating rod is pivotable about a pivot axis running substantially vertically. Thus, the actuating rod can be pivoted in a plane running substantially horizontally. Accordingly, the actuating rod can easily be moved past other components of the motor vehicle and the front wheel can rotate without unnecessary hinge bearing forces.

The actuating rod may have first and second lever arms. The first lever arm may point toward the cross member, while the second lever arm points toward the rim in a pivoted out state. The first lever arm may be shorter than the second lever arm. This gives rise, for the actuating rod, to a travel stepping up which leads, in the event of a comparatively small relative movement of the cross member during a small overlap crash, to a correspondingly greater movement of an actuating end of the actuating rod, said actuating end pointing towards the rim. The stepping up that is set can ensure that the front wheel is rotated promptly before plastic deformation into the volume bounded by the wheelhouse of the front end module.

A crash element for absorbing impact energy by plastic deformation may be supported on the cross member. In the direction of force flux in the event of a frontal impact, the cross member is arranged between the crash element and the actuating rod and/or the crash element is arranged between the cross member and the actuating rod. The crash element may be a crash box, honeycomb-shaped surface structure or the like, and can provide a conscious empty play so that the actuating rod is not moved unnecessarily in a less hard crash where there is no deformation of the motor vehicle into the volume bounded by the wheelhouse and is intended for the front wheel.

The actuating rod may be mounted pivotably on a longitudinal member of the motor vehicle frame. The longitudinal member is configured for carrying away higher loads and can therefore easily carry away the bearing forces occurring during the pivoting of the actuating rod during a small overlap crash. Furthermore, the actuating rod can be supported on the longitudinal member after rotation of the front wheel and, after a partial plastic deformation of the front end module has already taken place, can additionally stiffen the front end module. Thus, further plastic deformation of the front end module into the volume bounded by the wheelhouse can be avoided.

The actuating rod in the non-pivoted-out starting state may be positioned and oriented along a longitudinal member of the motor vehicle frame. In particular, the actuating rod may lie flat against the longitudinal member in the starting state. Thus, the actuating rod can assist the longitudinal member in carrying away longitudinal forces that occur during the frontal crash. In particular, the actuating rod can be preassembled with the longitudinal member and can be fit as a joint constructional unit during the production of the motor vehicle.

The actuating rod may have a stop surface that points toward the cross member for introducing impact energy. The stop surface is beveled to orient the cross member in the direction of the front wheel. In particular the stop surface may be formed by a lug protruding from the rest of the actuating rod. The actuating rod can thus be pivoted easily even if the actuating rod in the non-pivoted-out starting state is oriented substantially in the direction of travel. In addition, the lever effect, in particular the travel stepping up, for the actuating rod can be reinforced by the lug. In addition, the actuating rod may not project in the starting state into the volume bounded by the wheelhouse.

The invention is explained below using exemplary embodiments with reference to the attached drawings. The features illustrated below can illustrate an aspect of the invention both in each case individually and in combination.

DETAILED DESCRIPTION

Figure 1:
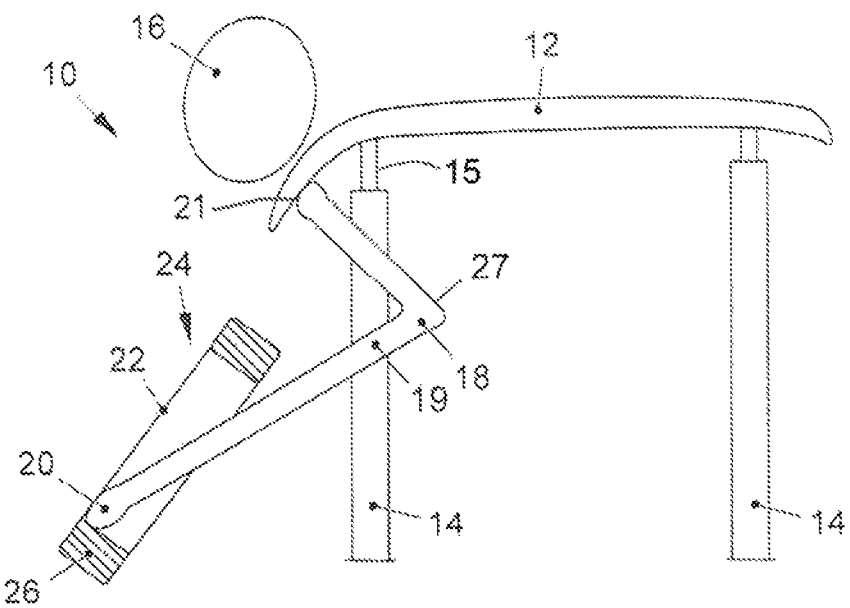
FIG. 1 is a schematic top view of a conceptual illustration of a front end module.

The front end module 10 illustrated in FIG. 1 has a cross member 12 that can be part of a bumper. The cross member 12 can be fastened to two longitudinal members 14 of a motor vehicle frame, optionally via a plastically deformable crash element 15, in particular a crash box.

If the front end module 10 strikes only with a width of up to 25% against an obstacle 16 during a small overlap crash, a part of the cross member 12 that protrudes with respect to the obstacle 16 can be bent, as shown in FIG. 1. The bent part of the cross member 12 can grip indirectly or directly on an actuating rod 18 that is mounted pivotably on the longitudinal member 14 at pivot location 19. The actuating rod 18 may have a stop surface 21 that points toward the cross member 12 for introducing impact energy. The stop surface 21 is beveled to orient the cross member 12 in the direction of a front wheel 24. In particular the stop surface 21 may be formed by a lug protruding from the rest of the actuating rod 18. The actuating rod 18 can thus be pivoted easily even if the actuating rod 18 in the non-pivoted-out starting state is oriented substantially in the direction of travel. In addition, the lever effect, in particular the travel stepping up, for the actuating rod 18 can be reinforced by the lug 21. As a result, the actuating rod 18 can engage by means of an actuating end 20 in a rim 22 of a front wheel 24 and can rotate the front wheel 26 without damaging a tire 26 held by the rim 22. In the illustrated embodiment, the actuating rod 18 has a laterally protruding lug 27 to provide a suitable travel stepping up and pivoting for the actuating rod 18.

Figure 2:
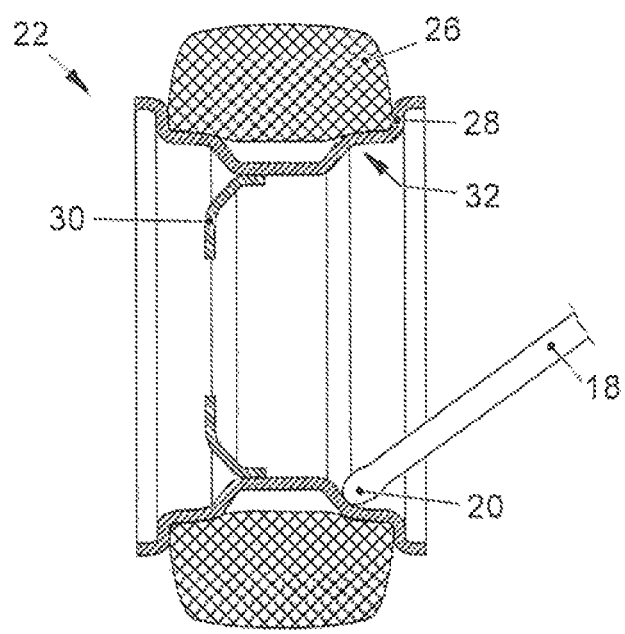
FIG. 2: is a schematic sectional view of a front tire of the front end module from FIG. 1.

As FIG. 2 illustrates, the rim 22 has a wheel rim ring 28 that supports the tire 26 and to which a wheel disk 30 is fastened, for example by welding. The wheel rim ring 28 and/or the wheel disk 30 can form a receiving corner 32 that encircles in the circumferential direction and in which the actuating end 20 of the actuating rod 18 can engage to rotate the front wheel 24.

What is claimed is:

1. A front end module for the front closure of a front part of a motor vehicle, comprising
   a cross member that is connectable to longitudinal members of a motor vehicle frame for carrying away loads from a bumper,
   a front wheel that is mounted in an articulated manner, the front wheel has a rim for supporting a tire, and
   an actuating rod that is pivotable relative to the front wheel in response to a relative movement of at least part of the cross member in a direction of travel of the motor vehicle, wherein the actuating rod, in a pivoted-out state, is gripped radially within a wheel rim ring of the rim for rotating the front wheel.

2. The front end module of claim 1, wherein the actuating rod in the pivoted-out state is gripped at a radially inwardly facing inner side of the wheel rim ring and/or at a laterally facing side surface of a wheel disk.

3. The front end module of claim 2, wherein at least one of the wheel rim ring and the wheel disk has a receiving corner that extends in a circumferential direction for receiving an actuating end of the actuating rod.

4. The front end module of claim 1, wherein the actuating rod can be gripped at the rim for rotating a front part of the front wheel in behind an axis of rotation of the front wheel.

5. The front end module of claim 1, wherein the actuating rod is pivotable about a pivot axis running substantially vertically.

6. The front end module of claim 1, wherein the actuating rod has first and second lever arms, the first lever arm being shorter than the second lever arm and pointing toward the cross member, the second lever arm, in the pivoted-out state, pointing toward the rim.

7. The front end module of claim 1, further comprising a crash element supported on the cross member for absorbing impact energy by plastic deformation, wherein, in a direction of force flux in a frontal impact, the crash element is arranged between the cross member and the actuating rod.

8. The front end module of claim 1, wherein the actuating rod is mounted pivotably on a longitudinal member of the motor vehicle frame.

9. The front end module of claim 1, wherein the actuating rod in a non-pivoted-out starting state is oriented along a longitudinal member of the motor vehicle frame and lies flat against the longitudinal member in the starting state.

10. The front end module of claim 1, wherein the actuating rod has a stop surface that points toward the cross member for introducing impact energy, wherein the stop surface is beveled to orient the cross member toward the front wheel, and the stop surface is formed by a lug protruding from the rest of the actuating rod.

* * * * *